United States Patent [19]
Hinchen

[11] Patent Number: 4,924,475
[45] Date of Patent: May 8, 1990

[54] BORON OXIDE LASER WITH CF4 ADDITIVE

[75] Inventor: John J. Hinchen, Manchester, Conn.

[73] Assignee: United Technologies Corporation, Hartford, Conn.

[21] Appl. No.: 300,774

[22] Filed: Jan. 23, 1989

[51] Int. Cl.[5] .............................................. H01S 3/095
[52] U.S. Cl. ......................................... 372/89; 372/55
[58] Field of Search ....................... 372/55, 59, 89–91, 372/39

[56] References Cited

PUBLICATIONS

Sinha, S.; "Theoretical Investigation of Superfluorescent Emission from an Optically Pumped $CF_4$ Gas Column"; J. of Applied Physics (Nov. 1, 1988) vol. 64, No. 9; pp. 4293–4300.

Patterson et al; "Modeling the $CF_4$ Laser"; Los Alamos Conference on Optics '81; pp. 209–216 of 624 pages.

Eckhardt et al; "$CF_4$ Laser Oscillator-Amplifier Measurements: Small Signal Gain and Self-Absorption"; Opt. Lett. (Apr. 1979) v. 4(4) pp. 112–114.

Primary Examiner—William L. Sikes
Assistant Examiner—B. R. Holloway
Attorney, Agent, or Firm—Perman & Green

[57] ABSTRACT

A laser having a gain medium which includes boron oxide (BO) is shown to have an increased optical power output and to achieve other benefits from the addition of carbon tetrafluoride ($CF_4$) to the gain medium. $CF_4$, when mixed with BO, induces a vibrational relaxation of a $BO(A^2\pi)$ population to a single vibrational level without a significant quenching of the $BO(A^2\pi)$ state. The rate of vibrational relaxation induced by the $CF_4$ additive occurs in an interval of time which is less than that associated with the radiative decay and quenching of the $BO(A^2\pi)$ state.

17 Claims, 2 Drawing Sheets

BORON OXIDE LASER WITH CF₄ ADDITIVE

FIELD OF THE INVENTION

This invention relates generally to boron oxide (BO) chemical lasers and, in particular, to a BO chemical laser having a carbon tetrafluoride ($CF_4$) additive for increasing the gain and the power output of the laser.

BACKGROUND OF THE INVENTION

A BO chemical laser operates on optical transitions between a molecular upper electronic $BO(A^2\pi)$ state and a molecular lower electronic $BO(X^2\Sigma+)$ state. These states are the result of products of a chemical reaction which generates a molecular population inversion between the two states. However, the population of the upper $BO(A^2\pi)$ state is distributed over a number of vibrational levels which causes the gain on any one particular level to be diluted by the vibrational level spreading. In order to increase both the gain and power of the laser it is necessary to drain the population from the higher vibrational levels of the $BO(A^2\pi)$ state and concentrate this population in the lowest (V=0) level. This would result in a significant increase in the gain and power of the $BO(A^2\pi)$ V=0 level. Such a population shift must further be accomplished without destroying, or quenching, the $BO(A^2\pi)$ population and must further be accomplished during an interval of time which is less than the radiative lifetime of $BO(A^2\pi)$, or approximately two microseconds.

It is therefore one object of the invention to provide a BO chemical laser which has a higher gain and a higher power output than previously known BO chemical lasers.

It is another object of the invention to provide an additive for a BO chemical laser which causes a population shift from the higher vibrational levels of the $BO(A^2\pi)$ state and which concentrates this population in the lowest (V=0) level.

It is another object of the invention to provide an additive for a BO chemical laser which causes a population shift from the higher vibrational levels of the $BO(A^2\pi)$ state and which concentrates this population in the lowest (V=0) level without significantly quenching the $BO(A^2\pi)$ state.

It is still another object of the invention to provide an additive for a BO chemical laser which causes a population shift from the higher vibrational levels of the $BO(A^2\pi)$ state and which concentrates this population in the lowest (V=0) level and which operates within an interval of time which is less than the radiative lifetime of the $BOA^2\pi)$ state.

SUMMARY OF THE INVENTION

The foregoing problems are overcome and the objects of the invention are realized by a BO chemical laser which includes a $CF_4$ additive to the laser gain medium. The $CF_4$, when mixed with BO, induces a vibrational relaxation of a $BO(A^2\pi)$ population to a single vibrational level without a significant quenching of the $BO(A^2\pi)$ state. The rate of vibrational relaxation induced by the $CF_4$ additive occurs in an interval of time which is less than that associated with the radiative decay and quenching of the $BO(A^2\pi)$ state. These beneficial effects are believed to result from a very close matching of vibrational energy level separation in $BO(A^2\pi)$ of 1260 cm$^{-1}$ with $CF_4$ of 1265 cm$^{-1}$.

Further in accordance with the invention there is disclosed a method of increasing the optical power of a laser having an optical gain medium which is comprised of boron oxide. The method includes the steps of (a) exciting a boron oxide population to energy levels which include and exceed an energy level of $BO(A^2\pi)$ V=0 and (b) relaxing a significant portion of the population which exceeds the $BO(A^2\pi)$ V=0 energy level to the $BO(A^2\pi)$ V=0 energy level within an interval of time which is less than a radiative lifetime of $BO(A^2\pi)$. The method further includes an initial step of adding carbon tetrafluoride to the optical gain medium.

BRIEF DESCRIPTION OF THE DRAWING

These and other aspects of the invention will be made more apparent in the following Detailed Description of the Invention when read in conjunction with the attached Drawing, wherein.

DETAILED DESCRIPTION OF THE INVENTION

In accordance with the invention it has been found that $CF_4$, when mixed with BO, causes a vibrational relaxation of a $BO(A^2\pi)$ population to a single vibrational level without a significant quenching of the $BO(A^2\pi)$ state. The rate of vibrational relaxation induced by the $CF_4$ additive furthermore occurs in an interval of time which is less than that associated with the radiative decay and quenching of the $BO(A^2\pi)$ state. These beneficial effects are believed to result from a very close matching of vibrational energy level separation in $BO(A^2\pi)$ of 1260 cm$^{-1}$ with $CF_4$ of 1265 cm$^{-1}$.

Other gases having relatively close matches to the vibrational energy level separation of $BO(A^2\pi)$ are $CO_2$ at 1280 cm$^{-1}$, $N_2O$ at 1284 cm$^{-1}$ and $CH_4$ at 1306 cm$^{-1}$. However, it has been determined that these other gases function as relatively slow vibrational relaxers as compared to the duration of the radiative decay and quenching of the $BO(A^2\pi)$ state. Hence, these other gases do not achieve the beneficial effect of relaxing the $BO(A^2\pi)$ energy levels to the V=0 level within the approximately two microsecond radiative lifetime of the $BO(A^2\pi)$ population.

Figure 1A:
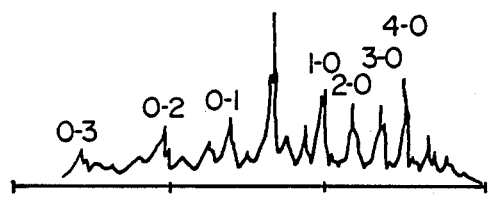
FIG. 1a illustrates a spectra from chemically produced BO wherein radiation is seen from the vibrational levels of V=0, V=1, V=2, V=3, V=4 and V=5 of $BO(A^2\pi)$.
Figure 1B:
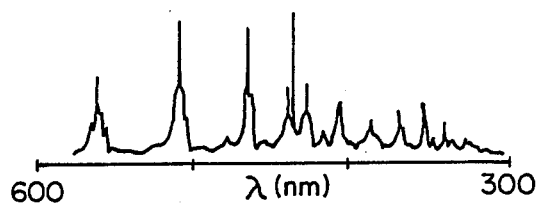
FIG. 1b illustrates a spectra where the radiation from chemically produced BO having an addition of two Torr of $CF_4$ is seen mostly from V=0.

An illustration of the unique vibrational pooling ability of $CF_4$ can be found in an examination of the chemiluminescent spectrum of BO. A spectra from chemically produced BO is shown in FIG. 1a where radiation from the vibrational levels V=0, 1, 2, 3, 4, and 5 of $BO(A^2\pi)$ is plotted. After the addition of two Torr of $CF_4$ (total pressure three Torr), the spectrum shown in FIG. 1b was obtained. It can be seen that the radiation resulting from V=0 has been increased by approximately three while the radiation resulting from energy levels V=1, 2, 3, 4 and 5 is substantially totally suppressed. This beneficial effect of $CF_4$ was demonstrated in a cw electric discharge flow experimental apparatus and in a laser pulsed experimental apparatus, both experimental apparatus operating at a relatively low pressure of less than approximately three Torr. A similar beneficial effect of $CF_4$ was also observed in a pulsed experimental apparatus operating at substantially higher pressure of approximately 40 Torr wherein there was provided approximately 20 Torr of $CF_4$. The BO employed in these three experimental apparatus was generated from $B+O_2$, $B+N_2O$, and $BH+O$ reactions, respectively, and had a pressure of less than approximately $10^{-3}$ Torr. It should be realized however that BO may be produced or provided by any suitable reaction mechanism.

Figure 2:
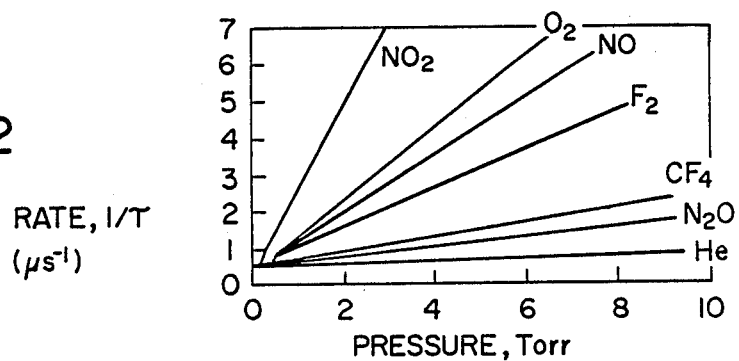
FIG. 2 is a graph which illustrates the rates of electronic quenching of $BO(A^2\pi)$ V=0 for various gas additives, including $CF_4$.

FIG. 2 illustrates vibrational relaxation rates for $BO(A^2\pi)$ V=0 with various gases by measurements obtained by a laser induced fluorescence (LIF) technique. A laser is employed to pump a population into the V=0 vibrational level of $BO(A^2\pi)$ and thereafter the rate at which this population is lost is determined by measuring the fluorescence intensity. These rates for electronic quenching illustrate that the quenching rate associated with $CF_4$ is relatively slow as compared to other gases and also to the radiative decay rate of $5.5 \times 10^5$ $sec^{-1}$.

Figure 3:
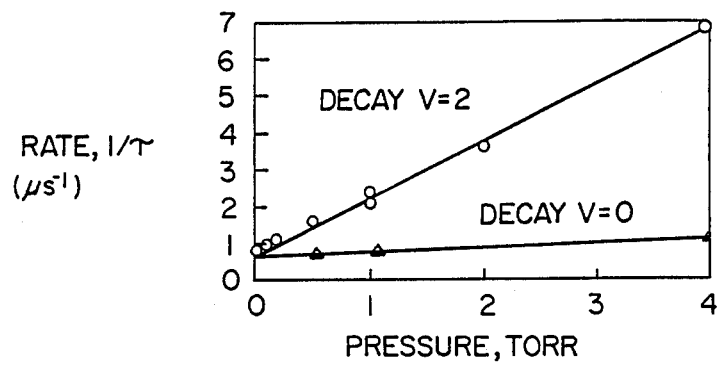
FIG. 3 is a graph which illustrates the rate of quenching of $BO(A^2\pi)$ V=0 and for vibrational relaxation of $BO(A^2\pi)$ V=2 with $CF_4$.

In FIG. 3 there is shown the rate of quenching of $BO(A^2\pi)$ V=0 and the rate of the vibrational relaxation of $BO(A^2\pi)$ V=2 with added pressure of $CF_4$. At approximately four Torr of $CF_4$ the vibrational relaxation rate has been found to be approximately seven times faster than the quenching rate and approximately 11 times faster than the rate of radiative decay.

Figure 4:
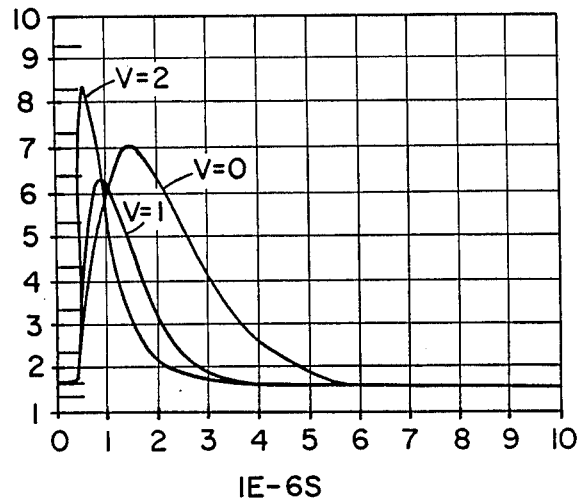
FIG. 4 is a graph which illustrates fluorescence decay traces showing the relaxation of $BO(A^2\pi)$ V=2 into V=1 and then into V=0 with two Torr $CF_4$.

FIG. 4 shows that a $BO(A^2\pi)$ population pumped into V=2 relaxes into V=0, as demonstrated by flourescence decay traces of $BO(A^2\pi)$ having two Torr of $CF_4$ as an additive. As can be seen the fluorescence, originally from the V=2 energy level, shifts to the V=1 level and then to the V=0 level with a relatively insignificant decrease in intensity. Thereafter the fluorescence from the V=0 level decays as a result of the quenching of the $BO(A^2\pi)$ state.

Figure 5:
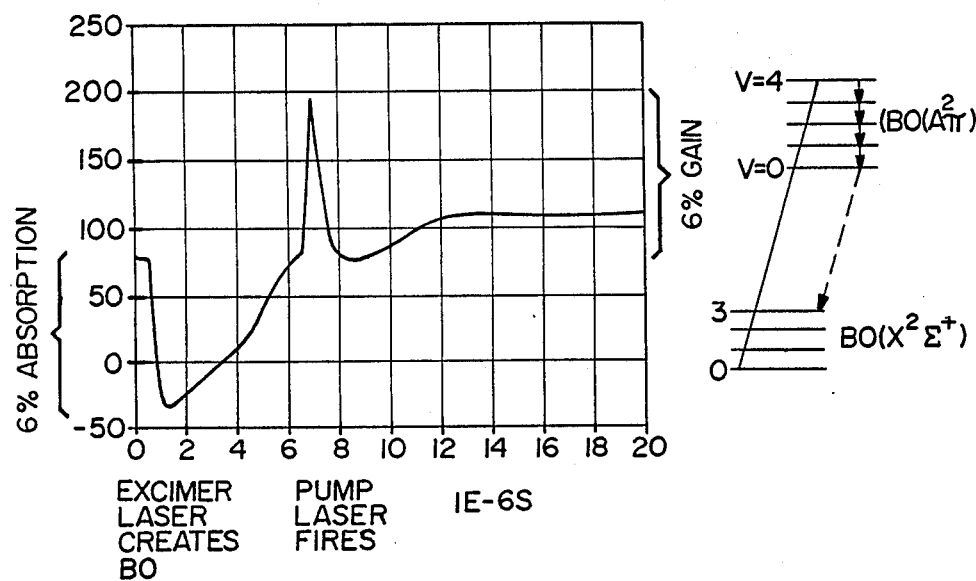
FIG. 5 is a graph which illustrates a laser probe measurement of gain produced by pumping population to $BO(A^2\pi)$ V=4 using pulsed radiation at 351 nm from a second laser, the gain from $BO(A^2\pi)$ V=0 being produced after relaxation from V=4 to V=0 with approximately 10 to 20 torr $CF_4$.
Figure 6:
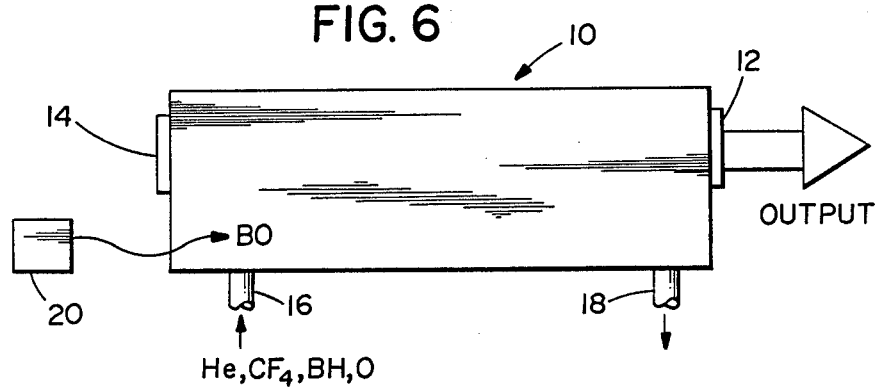
FIG. 6 is a simplified block diagram of a BO chemical laser constructed and operated in accordance with the invention.

FIG. 5 demonstrates the novel effect of $CF_4$ in increasing the optical gain of a BO laser system. The graph of FIG. 5 illustrates the result of; (a) creating BO by means of a chemical reaction between $B_2H_6$ and $N_2O$ initiated by an excimer laser, (b) pumping the BO population to $BO(A^2\pi)$ V=4 with a pulsed laser, (c) relaxing the excited population from V=4 to V=0 with approximately 10 to approximately 20 Torr of $CF_4$ added to the BO, (d) and measuring a gain of six percent with a cw laser probe. The measured changes in the cw laser probe intensity is plotted in FIG. 5. When the gain resulting from the V=4 level without $CF_4$ was measured the value was found to be only approximately two percent. In other words, an approximately three fold increase in optical gain is experienced by, in accordance with the invention, the addition of $CF_4$ to an optical gain medium comprised of BO. Referring now to FIG. 6 there is shown a simplified view of a BO chemical laser 10. Laser 10 is constructed as a flowing gas type of laser and includes a partially transmitting/partially reflecting outcoupling mirror 12 and a totally reflecting mirror 14. Mirrors 12 and 14 have a spacing therebetween which defines a cavity structure which is resonant at the emission wavelength of $BO(A^2\pi)$ V=0. An input 2 gas flow port 16 and an exit port 18 provides a flow comprised of a nonreactive carrier gas, such as helium, neon, argon, krypton and/or nitrogen, reactants to form BO and, in accordance with the invention, $CF_4$. BO was formed from reacting BH+O where these reactants were prepared by excimer laser 20 dissociation (at 193 nm) of $B_2H_6$ to make BH and of $N_2O$ to make 0. Chemical reactions generate $BO(A^2\pi)$ having the energy levels V=0, V=1, etc. These energy levels are relaxed by $CF_4$ into the V=0 level much faster than the radiative lifetime of approximately two microseconds after which an optical transition to the $BO(X^2\Sigma+)$ electronic state occurs. This transition generates optical radiation which is amplified within the resonant cavity structure and emitted as coherent optical radiation within the wavelength range of 423-612 nm. Of course, the BO may be generated from a number of other suitable reactants and by other means than by excitation from an excimer laser. Also, the device of FIG. 6 may be employed in an amplifier and not a resonator configuration. The pressure of BO may be less than approximately $10^{-3}$ Torr or may be greater than this pressure, so long as a sufficient quantity of $CF_4$ is provided to relax a significant portion of the $BO(A^2\pi)$ population to the V=0 energy level within the radiative lifetime. In this regard, and by example, it has been found that with a $10^{-3}$ Torr pressure of BO that a pressure of approximately one Torr of $CF_4$ is sufficient to relax a significant portion of the population to achieve substantially all of the optical emission power at the V=0 energy level. It has further been found that for this pressure of BO that increasing the $CF_4$ pressure beyond approximately 20 Torr does not achieve a significant further contribution to the power output.

It should therefore be understood that the various pressures and other parameters disclosed above are intended to be illustrative and are not intended to be read as limitations upon the practice of the invention. The invention is instead intended to be limited only as set forth in the claims which follow.

What is claimed is:

1. An optical gain medium comprising BO and $CF_4$.

2. An optical gain medium as set forth in claim 1 wherein a BO upper laser level is comprised of a $BO(A^2\pi)$ population.

3. An optical gain medium as set forth in claim 2 and further comprising a nonreactive carrier gas.

4. An optical gain medium as set forth in claim 3 wherein the carrier gas is comprised of helium, neon, argon, krypton, nitrogen or combinations thereof.

5. In a chemical laser having an optical gain medium, said optical gain medium comprising BO and $CF_4$.

6. A chemical laser as set forth in claim 5 and further comprising means for flowing said optical gain medium through said laser.

7. A chemical laser as set forth in claim 6 wherein said optical gain medium is used as an amplifier for amplifying a source of laser radiation.

8. A chemical laser as set forth in claim 6 and further comprising:

means for defining a resonant cavity structure; and
means for continuously providing said optical gain medium to said resonant cavity structure.

9. A chemical laser as set forth in claim 8 wherein said means for providing further comprises means for generating a $BO(A^2\pi)$ population.

10. A chemical laser as set forth in claim 9 wherein said means for generating comprises a source of optical radiation.

11. A chemical laser as set forth in claim 9 wherein means for generating comprises means for generating chemical reactions between reactants including boron containing molecules and oxidizers.

12. A chemical laser as set forth in claim 11 wherein said reactants include $B_2H_6$ and $N_2O$ and wherein said means for generating comprises a laser source having an output wavelength of less than approximately 200 nm.

13. A method of increasing the optical power of a laser having an optical gain medium which is comprised of boron oxide, the method comprising the steps of:
    exciting a boron oxide population to energy levels which include and exceed an energy level of $BO(A^2\pi)$ $V=0$; and
    relaxing a significant portion of the population which exceeds the $BO(A^2\pi)$ $V=0$ energy level to the $BO(A^2\pi)$ $V=0$ energy level within an interval of time which is less than a radiative lifetime of $BO(A^2\pi)$.

14. A method as set forth in claim 13 and including an initial step of adding carbon tetrafluoride to the optical gain medium.

15. A method as set forth in claim 14 wherein the step of exciting includes an initial step of generating the boron oxide population in-situ within the laser.

16. A method as set forth in claim 15 wherein the step of generating includes the steps of:
    introducing reactants including boron containing molecules and oxidizers; and
    dissociating the reactants with a source of optical radiation.

17. A method as set forth in claim 14 wherein the carbon tetrafluoride is added such that a pressure of the carbon tetrafluoride is greater than a pressure of the boron oxide.

* * * * *